United States Patent
Valenti et al.

(10) Patent No.: US 11,430,462 B2
(45) Date of Patent: Aug. 30, 2022

(54) SPEECH AID DEVICE AND METHODS RELATED THERETO

(71) Applicant: ProVal, LLC, North Kingstown, RI (US)

(72) Inventors: Leo F. Valenti, East Greenwich, RI (US); Thomas J. Valenti, North Kingstown, RI (US); Dean A. Plowman, Smithfield, RI (US)

(73) Assignee: ProVal, LLC, North Kingstown, RI (US)

( * ) Notice: Subject to any disclaimer, the term of this patent is extended or adjusted under 35 U.S.C. 154(b) by 0 days.

(21) Appl. No.: 17/071,814

(22) Filed: Oct. 15, 2020

(65) Prior Publication Data

US 2021/0134315 A1 May 6, 2021

Related U.S. Application Data

(60) Provisional application No. 62/915,625, filed on Oct. 15, 2019.

(51) Int. Cl.
*G10L 21/034* (2013.01)
*H04R 1/46* (2006.01)
*H04R 1/10* (2006.01)

(52) U.S. Cl.
CPC .......... *G10L 21/034* (2013.01); *H04R 1/1041* (2013.01); *H04R 1/46* (2013.01)

(58) Field of Classification Search
CPC ........ G10L 21/034; H04R 1/1041; H04R 1/46
USPC ......................................................... 381/107
See application file for complete search history.

(56) References Cited

U.S. PATENT DOCUMENTS

| | | | |
|---|---|---|---|
| 5,828,758 A * | 10/1998 | Byce | G09B 21/00 381/70 |
| 2017/0180923 A1 * | 6/2017 | Barron | H04R 5/0335 |
| 2017/0238863 A1 | 8/2017 | Kimmel | |

* cited by examiner

*Primary Examiner* — Paul Kim
(74) *Attorney, Agent, or Firm* — McDonnell Boehnen Hulbert & Berghoff LLP (57) ABSTRACT

The present disclosure relates generally to a speech aid device comprising a mount configured to couple to a head of a user, at least one sonic signal transmitter coupled to the mount, and a power supply electrically coupled to the at least one sonic signal transmitter. The at least one sonic signal transmitter is configured to transmit a sonic signal into at least one of a nasal cavity or a mouth cavity of the user when the mount is coupled to the head of the user.

21 Claims, 8 Drawing Sheets

SPEECH AID DEVICE AND METHODS RELATED THERETO

CROSS-REFERENCE TO RELATED APPLICATIONS

This application claims the benefit of priority to U.S. Provisional Application No. 62/915,625 filed on Oct. 15, 2019, the entire contents of which is incorporated by reference herein.

BACKGROUND OF THE DISCLOSURE

Field of the Disclosure

The present disclosure relates generally to speech aid devices and, more particularly, to a wearable speech aid device.

Background

Millions of individuals have difficulty speaking without the use of a speech aid device. Existing speech aid devices are intrusive and/or need to be actively operated by the user in order to speak.

For example, one existing speech aid device is a tracheoesophageal voice prosthesis ("TEP"). A TEP device is inserted between the lungs and the esophagus of the user. This requires puncturing a hole between the trachea and the esophagus. Traditional TEP devices frequently leak liquid into the user's lungs. TEP devices further require frequent replacement.

Also, for example, another existing speech aid device is an electrolarynx device. An electrolarynx is a handheld device used to vibrate the user's neck. The device requires a high vibration level in order to compensate for the amount by which the vibration is dampened by the neck. Accordingly, an electrolarynx can aggravate injuries to the head or neck. Additionally, the high vibration requirements uses a high amount of electrical energy, requiring frequent charging or replacement of batteries. Lastly, an electrolarynx device is held against the neck during use, which interferes with the user's ability to perform other tasks while talking.

SUMMARY OF THE DISCLOSURE

In one example, a speech aid device includes a mount configured to couple to a head of a user, a power supply coupled to the mount, and at least one sonic signal transmitter electrically coupled to the power supply. The at least one sonic signal transmitter is configured to transmit a sonic signal into at least one of a nasal cavity or a mouth cavity of the user when the mount is coupled to the head of the user.

In some examples, the at least one sonic signal transmitter includes at least one speaker configured to be received within a nostril of the user. In other examples, the at least one sonic signal transmitter comprises at least one speaker and at least one tube extending from the at least one speaking. The at least one tube is configured to be received within a nostril of the user and wherein the at least one speaker is configured to transmit the sonic signal into the nostril via the at least one tube.

In some examples, the speech aid device further includes a user input device configured to receive a user input and a control circuit operably coupled to the user input device and the at least one sonic signal transmitter. The control circuit is configured to adjust at least one of a volume or a frequency of the sonic signal in response to the user input.

In some examples, the sonic signal comprises a first tone having a first frequency. In some examples, the sonic signal further includes a second tone having a second frequency. The second frequency is higher than the first frequency. In still further examples, the sonic signal includes an oscillating signal with a frequency and/or tone that varies over time.

In another example, a method of aiding speech includes transmitting a sonic signal into a nasal cavity of a user by a sonic signal transmitter, and amplifying a sound including a modulated portion of the sonic signal proximate a mouth of the user by a microphone.

In some example examples, the method further includes modulating the sonic signal by articulating at least one of the mouth and a tongue of the user.

Additional aspects of the disclosure will be evident from the disclosure herein.

BRIEF DESCRIPTION OF THE DRAWINGS

The accompanying drawings are included to provide a further understanding of the methods and devices of the disclosure, and are incorporated in and constitute a part of this specification. The drawings are not necessarily to scale, and sizes of various elements may be distorted for clarity. The drawings illustrate one or more embodiment(s) of the disclosure, and together with the description serve to explain the principles and operation of the disclosure.

DETAILED DESCRIPTION

The present disclosure provides for systems and methods that allow a person to speak who has vocal disabilities or problems. Within examples, the system can include an audio signal generator or sonic signal transmitter that can transmit an audio signal into a mouth of a user. In the mouth of the user, the audio signal can be modulated to form a modulated audio signal that carries speech information. The system can further include a microphone that can capture the modulated audio signal, a processor that can process the modulated audio signal to form a modified audio signal, and an audio speaker that can output the modified audio signal.

In some examples, the sonic signal transmitter can be a speaker, which can be positioned in the nostril or mouth of the user. In this example, the sonic signal transmitter can generate the audio signal within the head of the user and into the mouth of the user either directly or via the nasal cavity.

In other examples, the sonic signal transmitter can be a vibration device, which can be positioned proximate to a bone in a face of the user (e.g., a cheek bone, a jaw bone, and/or a nasal bone). In this example, the sonic signal transmitter can generate the audio signal in the form of vibrations, which are conducted along the bone and into the mouth of the user. To conduct the audio signal along the bone, the audio signal can have a relatively low frequency (e.g., a frequency between approximately 50 Hz and approximately 5000 Hz. The audio signal can also have a fixed frequency. In other examples, the audio signal has a variable frequency.

In still further examples, the sonic signal transmitter can include one or more vibrating or audio devices that cause the throat of the user to vibrate, thus generating a sonic signal in the throat of the user. The sonic signal is modulated by the mouth and/or the tongue of the user to form the modulated audio signal. The modulated audio signal is detected, conditioned, and amplified by a sonic signal modifier circuit. This process allows for the use of multiple frequencies of signal which can be demodulated and presented as a modified audio signal. The use of demodulation and modification by the device allows the use of nonaudible signals in the transmitted and modulated sonic signals to be detected and used to create the modified, audible sonic signal.

The microphone can be positioned near the mouth to facilitate capturing the modulated audio signal. The processor can process the captured modulated audio signal to form the modified audio signal, and provide the modified audio signal to the speaker. The speaker can then output the modified audio signal. In this way, the system can generate intelligible speech in an intuitive manner.

In one example, the processor can amplify the modulated audio signal. In another example, the processor can process the modulated audio signal by translating the speech information from a first language of the modulated audio signal to a second language of the modified audio signal. In another example, the processor can convert the modulated audio signal from a first frequency range of the modulated audio signal to a second frequency range of the modified audio signal. In one implementation, the second frequency range can be a range of frequencies that is inaudible to humans.

Figure 1A:
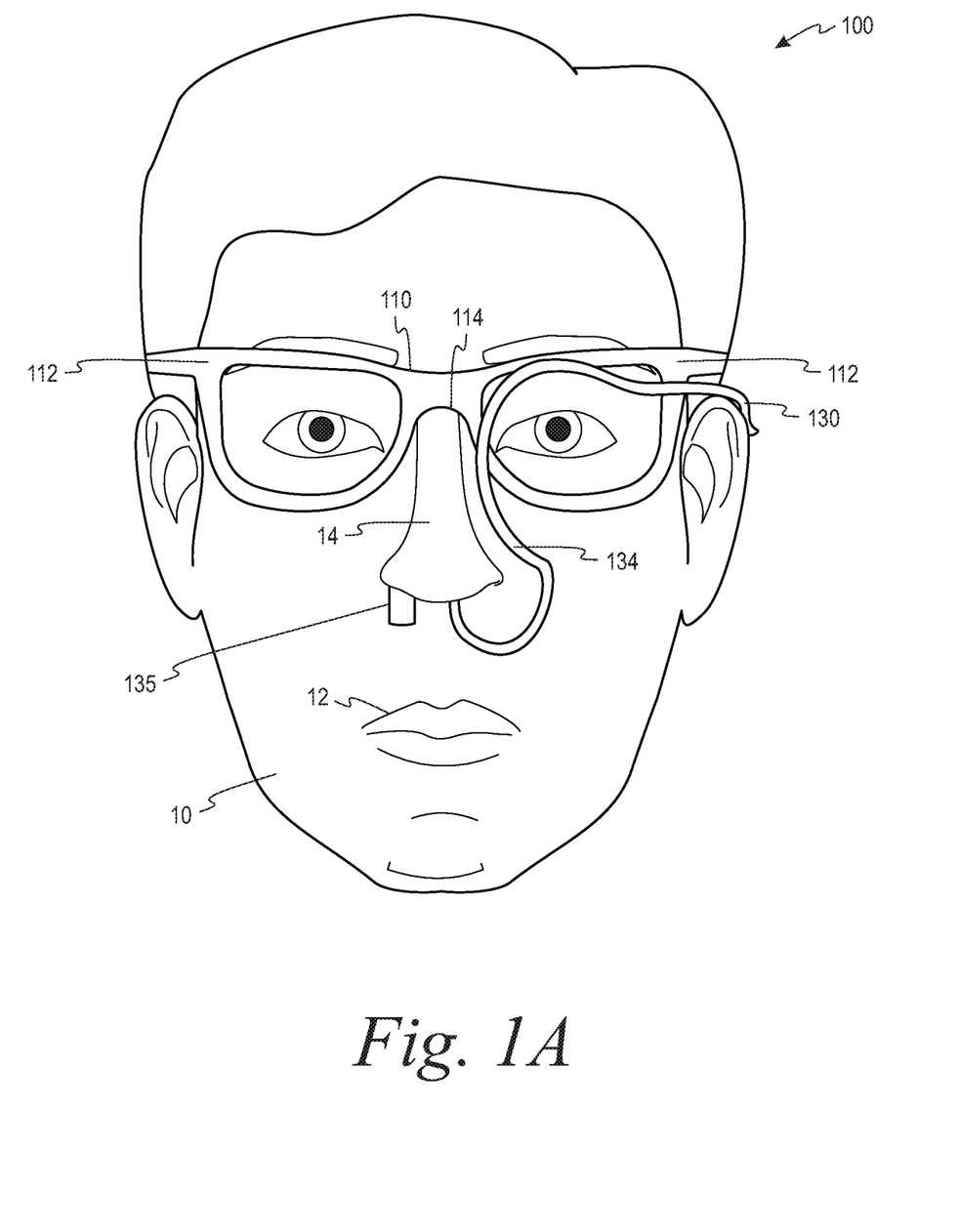
FIG. 1A is a front plan view of a speech aid device according to an example of the disclosure.
Figure 1B:
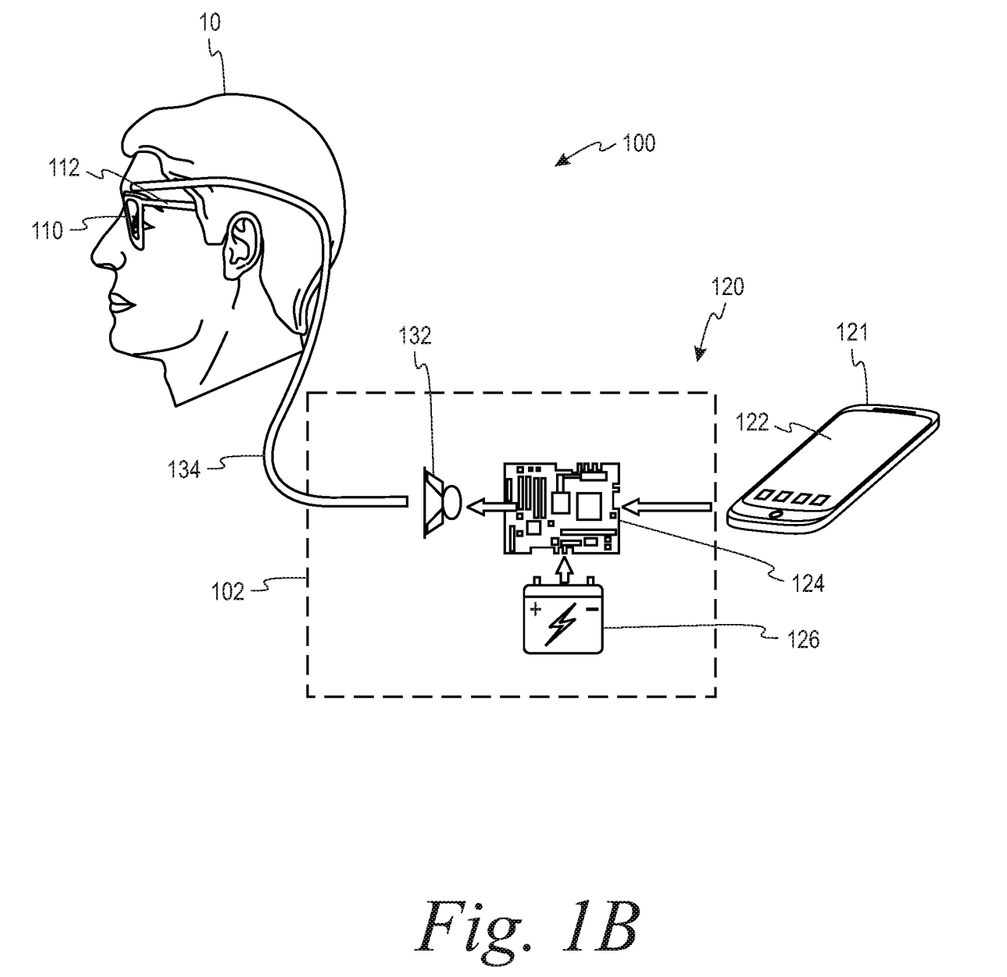
FIG. 1B is a side view of the speech aid device of FIG. 1A.

An exemplary speech aid device 100 is illustrated in FIGS. 1A-1B. The speech aid device 100 comprises a mount 110, a control circuit 120, and a sonic signal transmitter 130. The speech aid device 100 is configured to be worn by the user 10 and to transmit a sonic signal either directly or indirectly into the mouth 12 of the user.

The mount 110 of the speech aid device 100 can be a frame of eyeglasses. The mount 110 includes a pair of hooks 112 configured to extend at least partially around respective ears of the user 10. The mount 110 further includes a nose pad 114 configured to rest on the nose 14 of the user. In some forms, the speech aid device 100 is configured to detachably couple to the frame of an existing pair of eyeglasses or sunglasses such that the existing glasses serve as the mount 110. Alternatively or additionally, another structure is used to secure the speech aid device 100 to the user 10. In some forms, the sonic signal transmitter 130 includes a deformable tip, such as a silicon or rubber tip, configured to frictionally engage the inner surface of the user's nostril.

The sonic signal transmitter 130 includes one or more signal generators 132, (such as, for example, a speaker, a vibration device, and/or a transducer) that are configured to transmit a sonic signal into the mouth 12 of the user 10. In the shown form, the sonic signal transmitter 130 includes a speaker 132. The speaker 132 is operably coupled to a tube 134 which extends from the speaker 132 into a nostril 15 of the user 10. The speaker 132 transmits a sonic signal along the tube 134 into the nostril 15 of the user 10. The sonic signal then propagates through the nasal cavity into the mouth 12 of the user 10.

In some embodiments, the sonic signal transmitter 130 includes two speakers 132 with one speaker 132 being positioned in each nostril. In alternative embodiments, only a single nostril contains a speaker 132, such as shown in FIG. 1A. In some forms, a plug 135 is placed in the speakerless nostril. The plug 135 reduces audio signal propagation through the speakerless nostril, thus directing more of the sonic signal through the nasal cavity towards the mouth.

The sonic signal transmitter 130 is operably coupled to the control circuit 120. The control circuit 120 includes a sound controller 121 with a user input 122, an amplifier 124, and a power source 126. In some embodiments, the sound controller 121 includes a smartphone or other computing device operating software configured to receive inputs through the user input 122 (e.g. touchscreen) of the device from the user 10. The sound controller 121 then operates the sonic signal transmitter 130 to transmit the sonic signal to the user 10. The sound controller 121 adjusts the sonic signal based on the user inputs. Adjustments include changes to the tone, frequency, volume, and/or timing of the sonic signal.

The power source 126 powers one or more elements of the speech aid device 100. In some examples, the power source 126 provides power to the control circuit 120 and the sonic signal transmitter 130. In some embodiments, the power source 126 is an external battery physically coupled to a carry pack 102 and/or the mount 110 of the speech aid device. In other embodiments, the power source 126 is the smartphone of the user. Alternatively or additionally, the power source 126 includes a port or cord configured to couple the speech aid device to an external power source, such as a USB port or electrical outlet.

The amplifier 124 is configured to amplifier the sonic signal from the sound controller 121. In some forms, the amplifier 124 is positioned along a signal pathway between the sound controller 121 and the speaker 132 to amplify the signal transmitted from the sound controller 121 to the speaker 132. In alternative embodiments, the amplifier 124 is positioned after the sonic signal transmitter 130 along the signal pathway and is configured to amplify the sonic signal output thereby. In some examples, the amplifier 124 is part of the sound controller 121 or part of the sonic signal transmitter 130.

In operation, the user 10 inputs commands into the sound controller 121 via the user input 122. In response to the commands, the sound controller 121 outputs a control signal. The control signal is amplified by the amplifier 124 and passed on to the sonic signal transmitter 130. The sonic signal transmitter 130 generates a sonic signal based on the control signal. The sonic signal is transmitted into the mouth of the user 10 indirectly by way of the tube 134 and nose 14 of the user 10.

The user 10 can modulate the sonic signal by articulating their mouth and/or tongue. The modulation of the sonic signal produces a modulated sonic signal that is transmitted out of the user's mouth 12. The modulation of the signal reflects the articulation of the user's mouth and/or tongue similarly to natural speech.

In some examples, the sonic signal and thus the modulated sonic signal are audible signals. The modulated sonic signal can therefore be understood by individuals around the user as speech.

In other examples, the speech aid device includes a microphone for detecting the modulated sonic signal, a control circuit for processing and modifying the modulated sonic signal, and a speaker for outputting the modified sonic signal.

Figure 2:
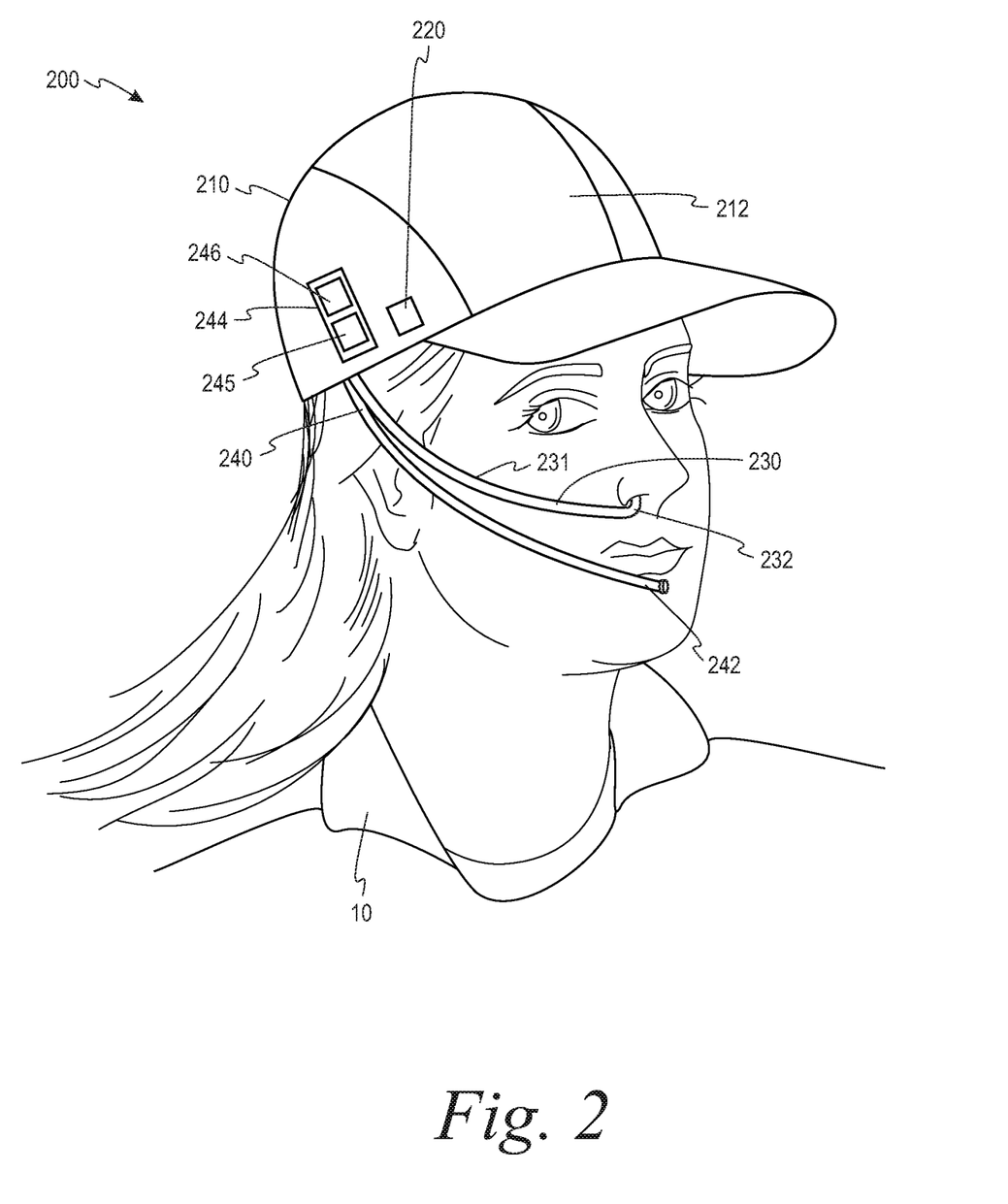
FIG. 2 is a perspective view of a speech aid device according to another embodiment of the disclosure.

FIG. 2 illustrates an example speech aid device 200 according to another example. The speech aid device 200 comprises a mount 210, a control circuit 220, a sonic signal transmitter 230, and a sonic signal modifier 240.

The mount 210 has the form of a hat, such as a baseball cap. The mount 210 includes a band 212 extending around the head of the user 10 so as to couple the speech aid device 200 to the head of the user 10. In some forms, the speech aid device 200 is detachably coupled to an existing hat or cap, such that the existing hat or cap serves as the mount 210.

The control circuit 220 is substantially similar to the control circuit 120 described above. The control circuit 220 includes a sound controller, a user input, a power source, and an amplifier. In some forms, one or more components of the control circuit 220 is coupled directly to the mount 210, so as to be mounted on the head of the user 10. Alternatively or additionally, one or more elements of the control circuit 220 are tethered to the mount 210 by an electrical cable and/or tube. The tethered control circuit 220 components are separately carried by the user, such as in a carry pack or in a pocket or bag.

The sonic signal transmitter 230 includes a speaker 232 positioned in a nostril of the user 10. The speaker 232 transmits a sonic signal into the nasal cavity of the user 10. The sonic signal propagates through the nasal cavity and into the mouth of the user 10 so as to be modulated by mouth and/or tongue of the user as described above.

The sonic signal transmitted further includes a conductive cable 231 operably coupling the speaker 232 to the control circuit 220. The conductive cable 231 extends from the speaker 232 along the face of the user 10 to the mount 210. The cable 231 is sized to reduce slack therein so as to reduce interference by the cable 231 with the user 10. In some forms, the length of the section of cable 231 between the mount 210 and the speaker 232 is adjustable.

The sonic signal modifier 240 includes a microphone 242 and sonic modifier circuit 244. The microphone 242 is positioned proximate the mouth 12 of the user 10 and configured to detect the modulated sonic signal. The detected modulated sonic signal is transmitted by the microphone to the sonic modifier circuit 244. The sonic modifier circuit 244 is configured to modify the modulated sonic signal to produce an audible modified sonic signal. The sonic modifier circuit 244 includes a speaker 245 for outputting the modified sonic signal, such that the modified sonic signal can be heard by individuals proximate the user 10. The sonic modifier circuit 244 further includes an amplifier 246 configured to amplify the detected modulated sonic signal to form the modified sonic signal.

In some forms, the sonic modifier circuit 244 performs other modifications to the modulated sonic signal in addition to amplifying. The tone or frequency of at least a portion of the modulated sonic signal is adjusted. This adjustment allows the sonic signal to include tones outside of the audible spectrum, such that individuals do not hear, or hear only part of, the unmodulated sonic signal. The sonic modifier circuit 244 shifts the modulated sonic signal from outside of the audible spectrum to inside of the audible spectrum.

In still further examples, the sonic modifier circuit 244 is configured to parse the modulated sonic signal, and compare the parsed data to previously stored data. The sonic modifier circuit 244 then outputs previously stored audio signals based on the performed comparison.

In some forms, the sonic modifier circuit 244 is the same circuit as the control circuit 220. For example, both the sonic modifier circuit 244 and the control circuit 220 are a smartphone or other computing device running software containing instructions to perform the steps described herein.

In operation, the user 10 inputs commands into the control circuit 220. In response to the commands, the control circuit 220 outputs a control signal to the speaker 232 via the conductive cable 231.

The speaker 232 generates a sonic signal based on the control signal. The sonic signal is transmitted into the nostril of the user 10, from which it propagates through the nasal cavity and into the mouth of the user 10.

The user 10 can modulate the sonic signal by articulating their mouth and/or tongue. The modulation of the sonic signal produces a modulated sonic signal that is transmitted out of the user's mouth 12. The modulation of the signal reflects the articulation of the user's mouth and/or tongue similarly to natural speech.

The modulated sonic signal is detected by the microphone 242 and transmitted to the sonic modifier circuit 244. The sonic modifier circuit 244 modified at least one of volume, frequency, or tone of the modulated sonic signal to produce a modified sonic signal. The modified sonic signal is then output by a speaker 245.

Both of the example devices 100, 200 described above have a sonic signal transmitter 130, 230 comprising a speaker configured to transmit a sonic signal into a nostril of the user. However, other types of sonic signal transmitters can be used in place of or in addition to the speakers 132, 232 described above.

Figure 3:
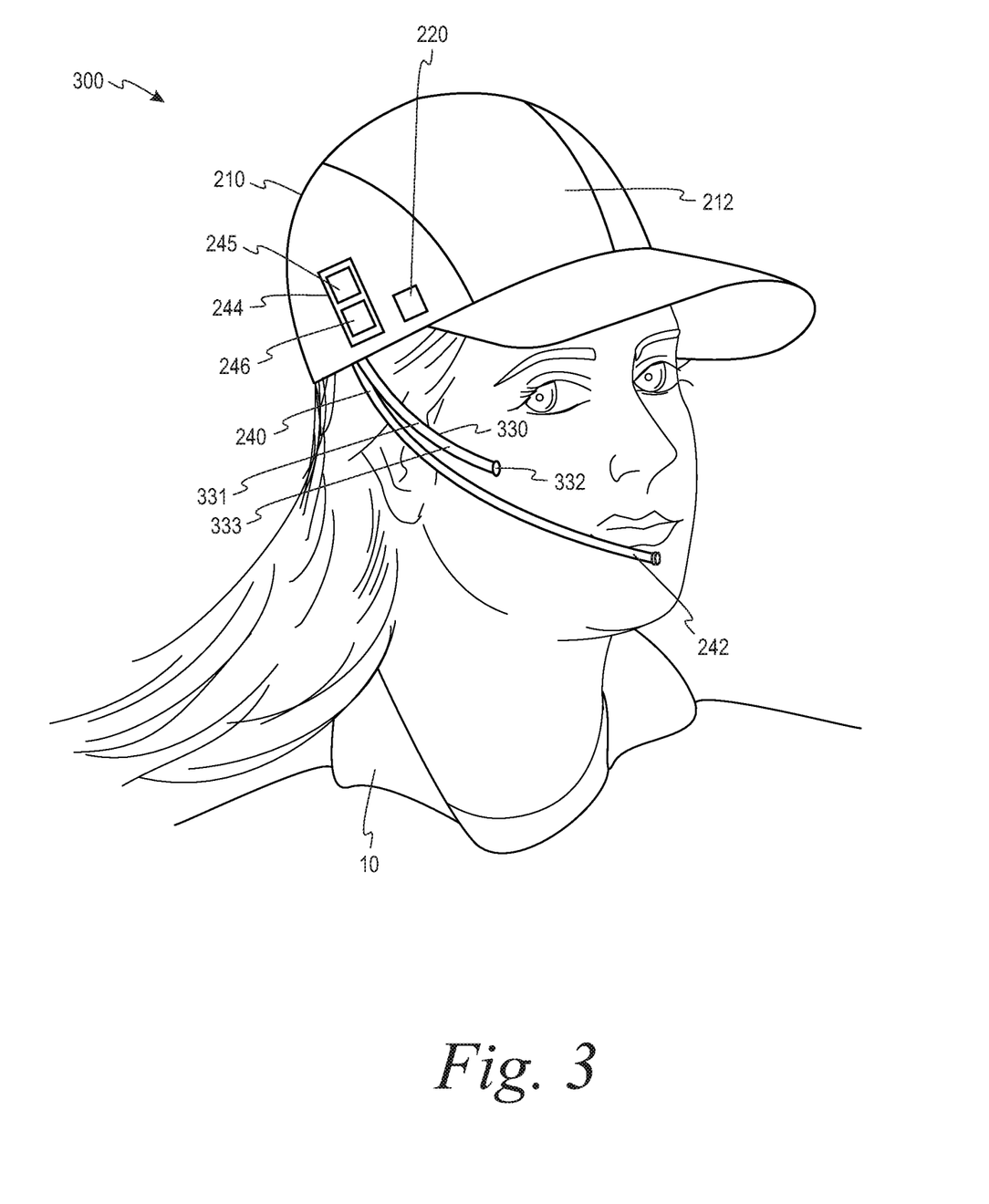
FIG. 3 is a perspective view of a speech aid device according to another example of the disclosure.

FIG. 3 illustrates a speech aid device 300 according to another example of the present disclosure. The speech aid device 300 includes a mount 210, control circuit 220, and sonic signal modifier 240 substantially similar to those shown and described above.

The speech aid device 300 further comprises a sonic signal transmitter 330. The sonic signal transmitter 330 includes a bone conduction transducer 332 positioned on the user so as to vibrate one or more bones of the user to generate a sonic signal.

The bone conduction transducer 332 is secured to the user 10 by a transducer mount 331. The transducer mount 331 is configured to hold the bone conduction transducer 332 securely against the user 10 proximate the one or more bones. In some forms, the transducer mount 331 is at least partially resilient and in operation is partially deformed such that the resilience of the transducer mount 331 applies a force holding the bone conduction transducer 332 against the user 10.

The transducer mount 331 shown in FIG. 3 secures the bone conduction transducer 332 against the upper jaw bone of the user 10. However, it is understood that a bone conduction transducer 332 can be secured against other bones, such as the lower jaw bone, a nose bone, or other portion of the scull.

The sonic signal transmitter 330 further includes a conductive cable 333 traveling along the transducer mount 331 to operably couple the bone conduction transducer 332 to the control circuit 220.

Figure 4:
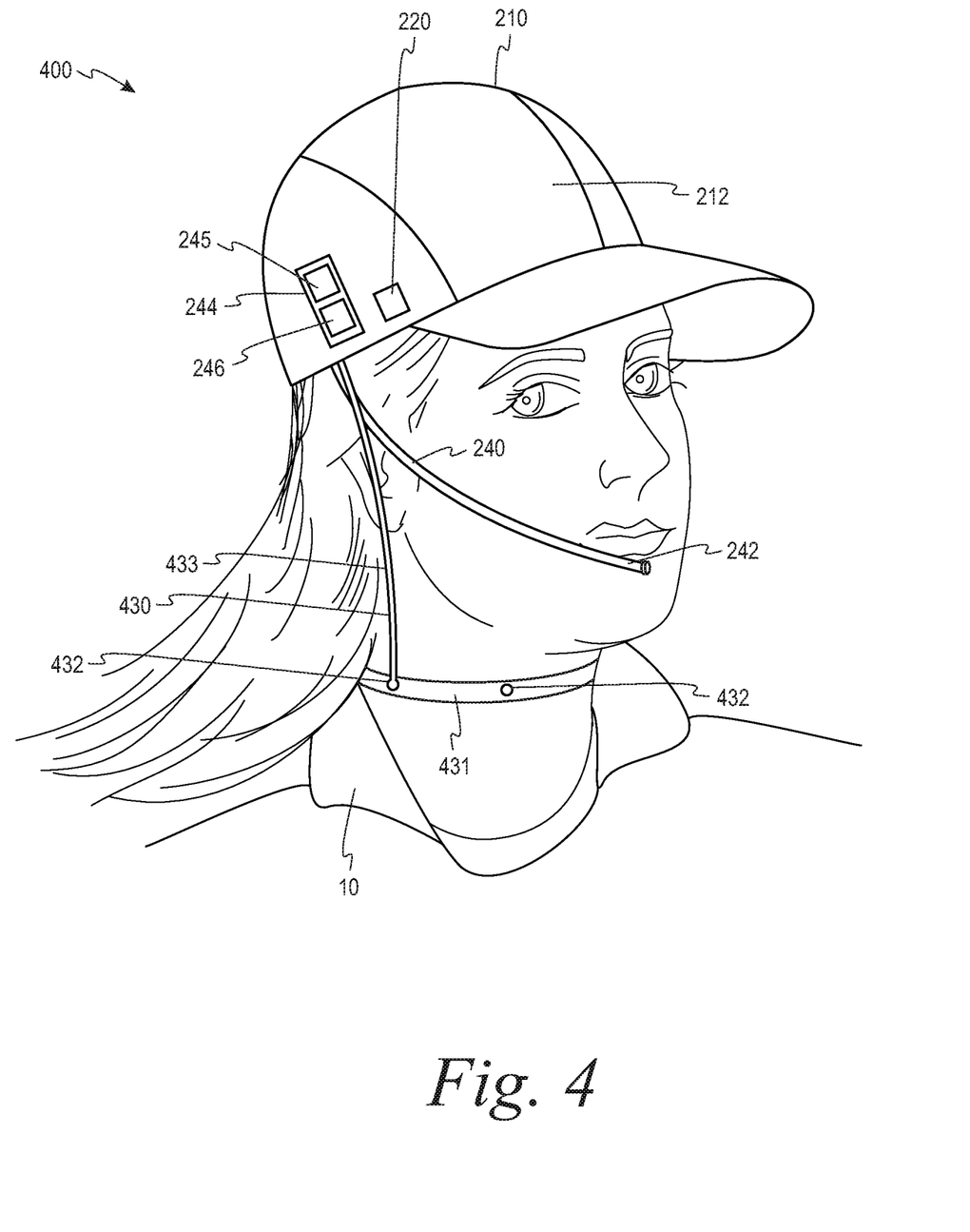
FIG. 4 is a perspective view of a speech aid device according to another embodi example ment of the disclosure.

FIG. 4 illustrates a speech aid device 400 according to another example of the present disclosure. The speech aid device 400 includes a mount 210, control circuit 220, and sonic signal modifier 240 substantially similar to those shown and described above.

The speech aid device 400 further comprises a sonic signal transmitter 430. The sonic signal transmitter 430 includes one or more transducers 432 positioned on the user so as to the throat of the user.

The transducers 432 are secured to the user 10 by a transducer mount 431. The transducer mount 431 is configured to hold the transducers 432 securely against the neck or throat of the user 10. In some forms, the transducer mount 431 is at least partially elastic or resilient and in operation is partially deformed such that the resilience of the transducer mount 431 applies a force holding the transducers 432 against the user 10. For example, the transducer mount 431 comprises an elastic band extending around the neck of the user 10. One or more transducers 432 are positioned along the elastic band, so as to be held in place against the sides or front of the throat of the user 10.

The sonic signal transmitter 430 further includes a conductive cable 433 traveling along the transducer mount 431 to operably couple the transducers 432 to the control circuit 220.

The speech aid devices 300, 400 operate in substantially the same manner as the speech aid device 200 described above.

Figure 5:
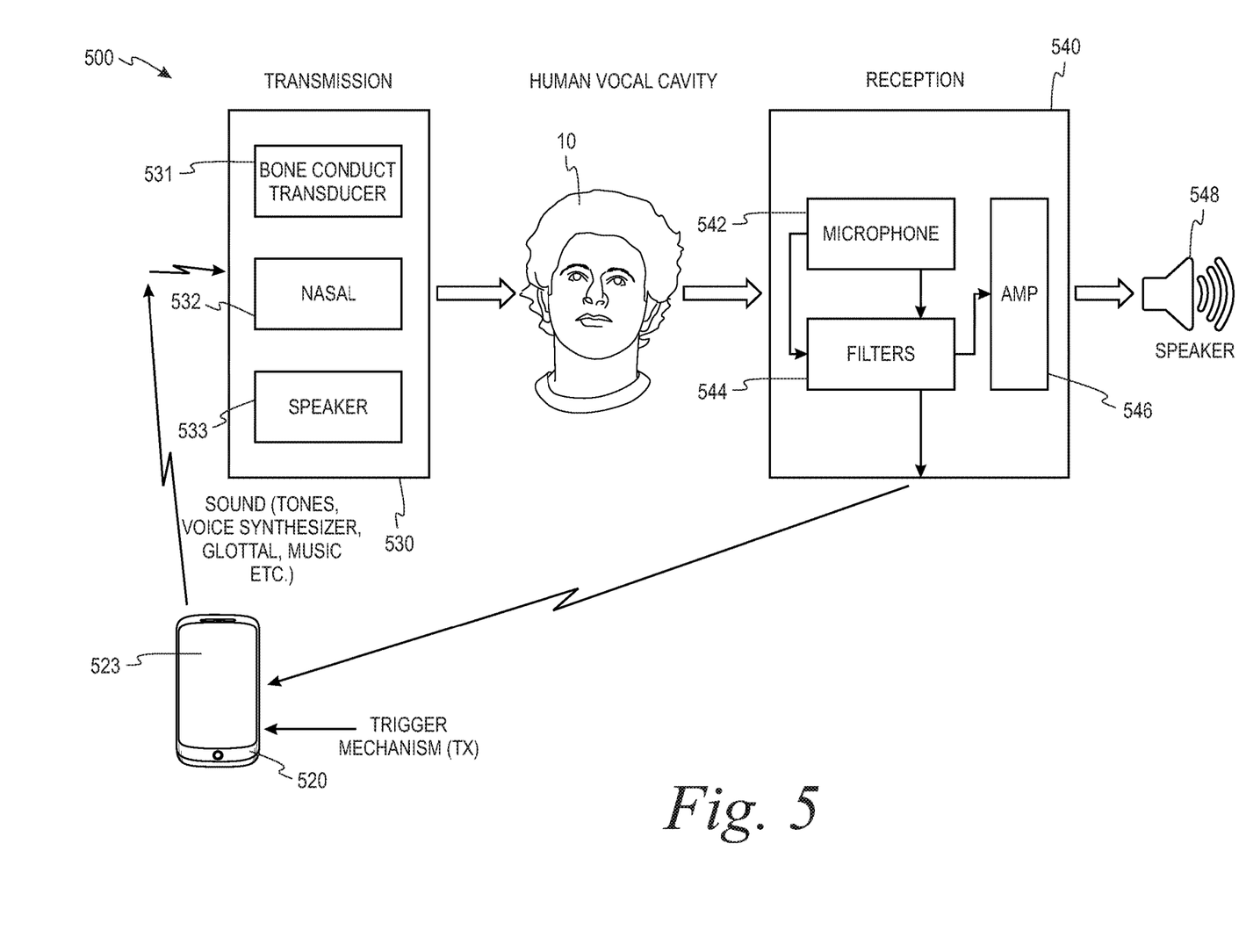
FIG. 5 is simplified diagram illustrating a speech aid device according to another example of the disclosure.

FIG. 5 is a simplified block diagram illustrating an example speech aid device 500. The speech aid device 500 includes a control circuit 520, a sonic signal transmitter 530, and a sonic signal modifier 540.

The control circuit 520 includes a user input 523 and circuitry for generating and controlling a sonic signal. As shown, in some embodiments, the control circuit 520 is a standard smartphone or other computing device having computer readable memory, such as non-transitory memory, and a processor. The computer readable memory stores software having instructions, that cause the processor to generate a sonic signal or control signal in response to inputs from the user.

The sonic signal transmitter 530 includes one or more of a bone conduction transducer 531, nasal speaker 532, or other speaker/transducer 533. The sonic signal transmitter 530 is configured to either directly or indirectly transmit the sonic signal into the vocal cavity of the user 10.

The sonic signal modifier 540 includes a microphone 542, one or more filters 544, an amplifier 546, and a speaker 548. The microphone 542 detects sound, including the modulated sonic signal, proximate the mouth of the user 10. The filters 544 and amplifier 546 modify the detected modulated sonic signal to produce a modified sonic signal. The modified sonic signal is output by the speaker 548.

Figure 6:
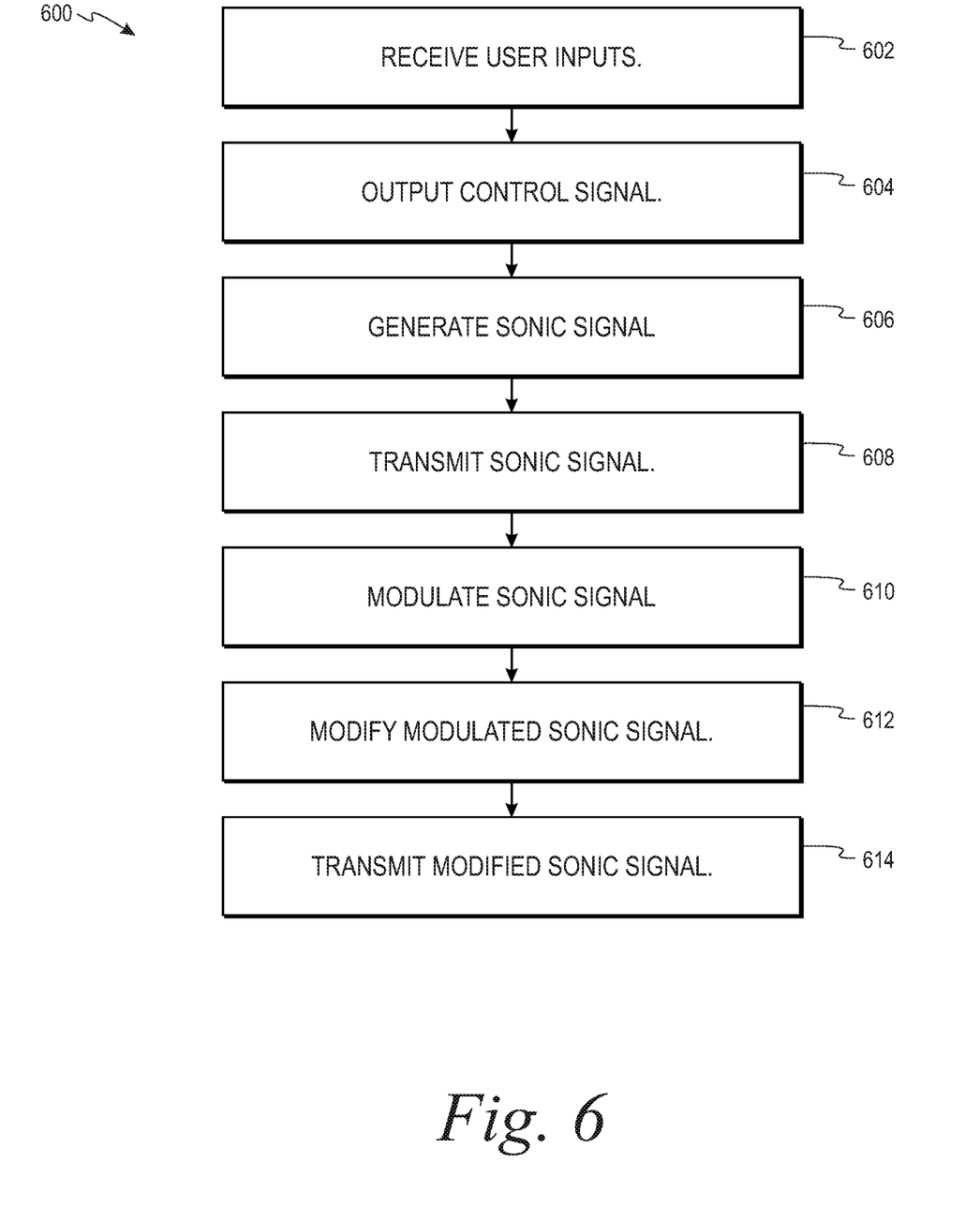
FIG. 6 is a flowchart illustrating a method of aiding speech according to another example of the disclosure.

FIG. 6 illustrates a method 600 of aiding speech. The method 600 is at least partially performed by a speech aid device, such as the speech aid devices 100, 200, 300, 400, or 500 described above.

The method includes receiving 602 user inputs via the user input of a control circuit. In response to the commands, the control circuit outputs 604 a control signal to the sonic signal transmitter.

The sonic signal transmitter generates 606 a sonic signal based on the control signal. The sonic signal is transmitted 608, directly or indirectly, into the vocal cavity of the user. In some examples, transmitting 608 the sonic signal includes transmitting the sonic signal into the nasal cavity, bone, or throat of the user as described above.

The user can modulate 610 at least a portion of the sonic signal by articulating their mouth and/or tongue. The modulation of the sonic signal produces a modulated sonic signal that is transmitted out of the user's mouth. The modulation of the signal reflects the articulation of the user's mouth and/or tongue similarly to natural speech.

At least a portion of the modulated sonic signal is modified 612 by a sonic signal modifier. Modifying 612 the modulated sonic signal can include amplifying the modulated sonic signal and/or adjusting the frequency or tone of the modulated sonic signal. As discussed above, modifying 612 the sonic signal can include selecting pre-stored sound data based on the detected modulated sonic signal to form the modified sonic signal.

Lastly, the modified sonic signal is transmitted 614 by a speaker of the speech aid device.

In alternative examples, the method 600 is performed by a combination of devices acting as the components of the speech aid devices described herein. For example, a speech aid device can include a smartphone or other computing device having computer readable memory and a processor. The smartphone has software stored thereon having instructions that cause the processor to perform the functions of the control circuit and the sonic signal modifier. The smartphone additionally has the power source and the speaker for transmitting the modified sonic signal.

Each of the devices disclosed herein transmit a sonic signal into the vocal cavity of the user. In some embodiments, the sonic signal includes at least a first tone and a second tone. The first tone has a first frequency and the second tone has a second frequency, wherein the second frequency is higher than the first frequency.

In some forms, the first frequency is within a range of approximately 50 Hz to approximately 850 Hz. In one form, the first frequency is within a range of approximately 50 Hz to approximately 500 Hz. This first tone is modulated by the user to produce vowel sounds. In some forms, the second frequency is within a range of approximately 250 Hz to approximately 5000 Hz. This second tone is modulated by the user to produce consonant sounds. In one form, the second frequency is within a range of 750 Hz to approximately 2500 Hz. In addition to these two tones, one or more additional tones can be used. The additional tones may include additional tones within the vowel range, additional tones within the consonant range, additional tones spanning both ranges, and/or additional tones outside of the ranges discussed above. In some examples, additional tones having a frequency of up to 15,000 Hz are used.

In some forms, both the first and second tones are transmitted into the vocal cavity of the user simultaneously. In other forms, the sonic signal is an oscillating signal that sweeps through a range of frequencies including both the first frequency and the second frequency.

The sonic signal may include tones spanning a large portion of the audible range for humans. Alternatively, the sonic signal may only include tones within a small section of the audible range of humans. In still further examples, at least part of the sonic signal is outside of the audible range of humans.

In the latter two examples, the modulated sonic signal is modified by a sonic signal modifier to adjust the tone of the modulated sonic signal. The modified sonic signal can include tones outside of the range of tones contained within the original sonic signal.

Figure 7:
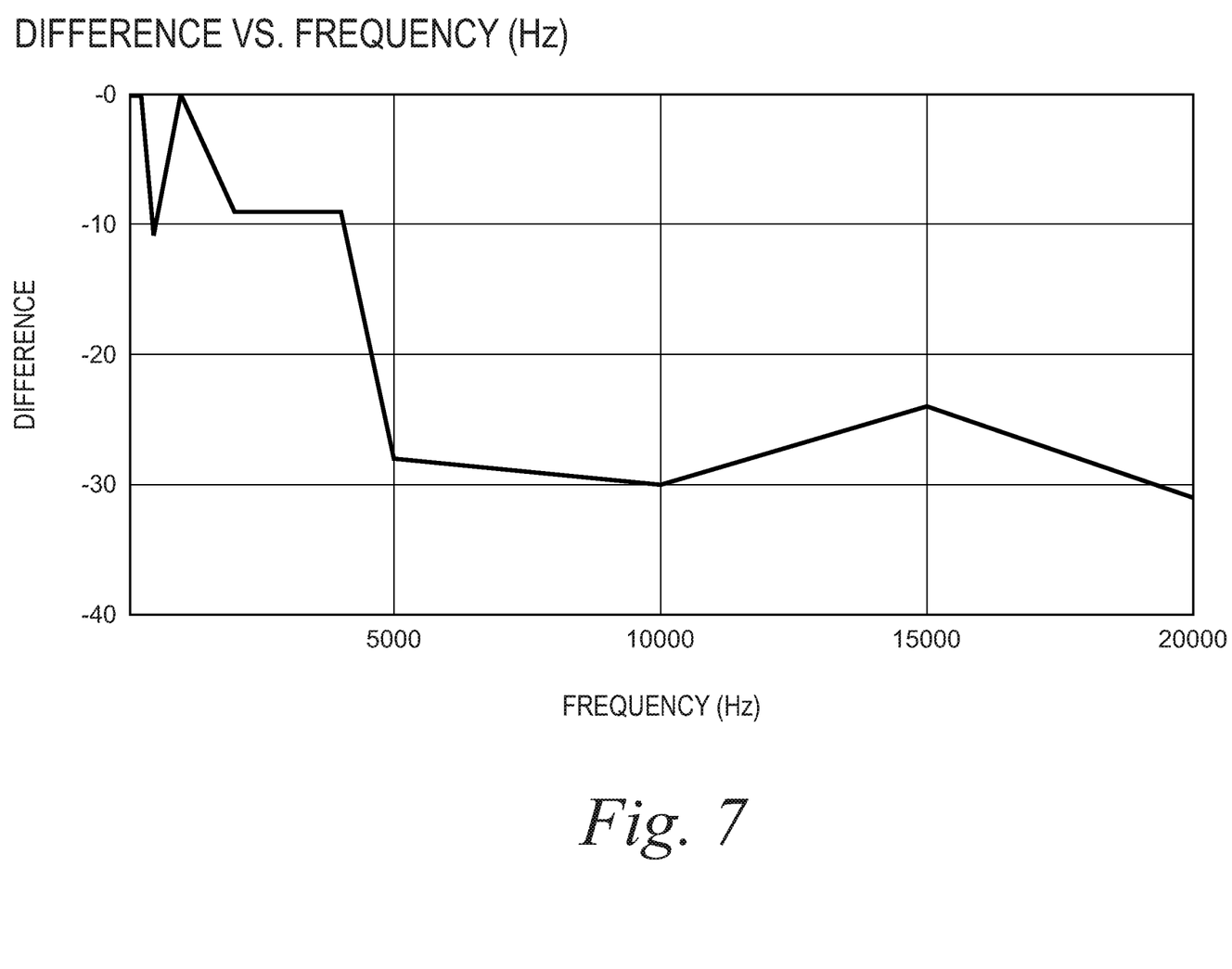
FIG. 7 is a line chart illustrating the volume drop of a speech aid device compared to the frequency of the sonic signal use.

FIG. 7 illustrates a change in volume between a sonic signal transmitted into a nostril of a user compared to the volume of the modulated sonic signal detected proximate the mouth of the user across a range of frequencies. As shown, higher frequency sonic signals experience a higher loss in volume compared to lower frequency signals. In some embodiments, the sonic signal includes tones having a frequency below 5000 Hz to reduce the volume loss.

It will be apparent to those skilled in the art that various modifications and variations can be made to the processes and devices described here without departing from the scope of the disclosure. Thus, it is intended that the present disclosure cover such modifications and variations of this invention provided they come within the scope of the appended claims and their equivalents.

Each of the embodiments disclosed herein are intended only as illustrative examples of various concepts of the present invention. The invention is not limited to these specific examples. In addition, it is understood that the features of the various exemplary embodiments can be interchanged or combined. For example, the speech aid device 100 may include a hat shaped mount 210 and/or a sonic signal modifier 240.

What is claimed is:

1. A speech aid device comprising:
   a mount configured to couple to a head of a user;
   at least one sonic signal transmitter coupled to the mount; and
   a power supply electrically coupled to the at least one sonic signal transmitter,
   wherein the at least one sonic signal transmitter is configured to transmit a sonic signal into a nasal cavity of the user when the mount is coupled to the head of the user,
   wherein the at least one sonic signal transmitter comprises at least one speaker and at least one tube extending from the at least one speaker, wherein the at least one tube is configured to be received within a nostril of the user, and wherein the at least one speaker is configured to transmit the sonic signal into the nostril via the at least one tube.

2. The speech aid device of claim 1, wherein the mount comprises a band sized to extend around a head of the user.

3. The speech aid device of claim 1, wherein the mount comprises a hat.

4. The speech aid device of claim 1, wherein the mount comprises at least one hook configured to extend at least partially around an ear of the user.

5. The speech aid device of claim 1, further comprising:
   a user input device configured to receive a user input; and
   a control circuit operably coupled to the user input device and the at least one sonic signal transmitter,
   wherein the control circuit is configured to adjust at least one of a volume, a tone, a timing, or a frequency of the sonic signal in response to the user input.

6. The speech aid device of claim 1, wherein the sonic signal comprises a first tone having a first frequency.

7. The speech aid device of claim 6, wherein the sonic signal further comprises a second tone having a second frequency, wherein the second frequency is higher than the first frequency.

8. The speech aid device of claim 6, wherein the first frequency is between about 50 Hertz (Hz) and about 500 Hz.

9. The speech aid device of claim 7, wherein the first frequency is between about 50 Hz and about 500 Hz, and wherein the second frequency is between about 750 Hz and about 2500 Hz.

10. The speech aid device of claim 9, wherein the at least one sonic signal transmitter includes a first sonic signal transmitter configured to transmit the first tone and a second sonic signal transmitter configured to transmit the second tone.

11. The speech aid device of claim 1, wherein the power supply comprises a plug configured to operably couple to an external power source.

12. The speech aid device of claim 1, further comprising a microphone coupled to the power supply.

13. A method of aiding speech comprising:
   inserting a sonic signal transmitter in a nostril of a user;
   transmitting, by a speaker of the sonic signal transmitter, a sonic signal into a nasal cavity of a user;
   propagating the sonic signal through the nasal cavity into a mouth of the user; and
   modulating, using at least one of the mouth or a tongue of the user, the sonic signal.

14. The method of claim 13, further comprising adjusting a volume of the sonic signal in response to a user input.

15. The method of claim 13, wherein transmitting the sonic signal comprises transmitting a first tone having a first frequency, and
   wherein transmitting the sonic signal further comprises transmitting a second tone having a second frequency, wherein the second frequency is higher than the first frequency.

16. The method of claim 15, wherein the first frequency is between about 50 Hz and about 500 Hz and wherein the second frequency is between about 750 Hz and about 2500 Hz.

17. The method of claim 13 further comprising modulating the sonic signal by articulating at least one of the mouth and a tongue of the user.

18. The method of claim 13 further comprising adjusting at least one of a frequency, a tone, or a timing of the sonic signal with a control circuit.

19. A speech aid device comprising:
   at least one sonic signal transmitter configured to transmit a sonic signal into a nasal cavity of a user, wherein the at least one sonic signal transmitter comprises at least one speaker configured to be received within a nostril of the user;
   a user input device configured to receive a user input; and
   a control circuit operably coupled to the user input device and the at least one sonic signal transmitter,
   wherein the control circuit is configured to adjust at least one of a volume, a tone, a timing, or a frequency of the sonic signal in response to the user input.

20. The speech aid device of claim 19, wherein the control circuit is configured to adjust the frequency of the sonic signal.

21. The speech aid device of claim 19, wherein the sonic signal comprises a first tone having a first frequency,
   wherein the sonic signal further comprises a second tone having a second frequency, wherein the second frequency is higher than the first frequency,
   wherein the first frequency is between about 50 Hz and about 500 Hz, and
   wherein the second frequency is between about 750 Hz and about 2500 Hz.

\* \* \* \* \*